United States Patent [19]

Groeger

[11] 4,375,035
[45] Feb. 22, 1983

[54] TETRAHEDRAL WINDMILL

[76] Inventor: Theodore O. Groeger, 2 Collamore Cir., West Orange, N.J. 07052

[21] Appl. No.: 251,006

[22] Filed: Apr. 3, 1981

[51] Int. Cl.³ .......................... F03B 3/14; F03D 7/02; F03D 11/02; F03D 11/04

[52] U.S. Cl. .......................................... 290/55; 416/9; 416/11; 416/196 A

[58] Field of Search ........................ 416/11, 196 A, 9; 290/43, 44, 51, 55

Primary Examiner—J. V. Truhe
Assistant Examiner—Shelley Wade
Attorney, Agent, or Firm—T. O. Groeger

[57] ABSTRACT

A wind-adjustable air turbine consisting of: 1. a tetrahedral support structure, 2. at least one blade extending into opposite tetrahedral edges, and 3. an axis of rotation extending from the structure's center and movable into any of the edges' centers, whereby the blade's rotation and/or drag is changed.

16 Claims, 5 Drawing Figures

TETRAHEDRAL WINDMILL

BACKGROUND OF THE INVENTION

Examining merely the complex products of our largest industry (automobiles), or the giant air turbines promoted by the government, we must conclude that neither producers, nor consumers, can afford to build and buy them satisfactorily. For example, according to Applicant's Aug. 14, 1980 NEW SCIENTIST article (reprint from Congressional Record, Ser. 96–78, pages 361-3), more than 10 million cars were recalled in 1977, but fewer sold, necessitating a $2 billion loan for a single manufacturer; i.e. each of said large number of cars had to be supported by the taxpayer with a $200 loan guaranty. Also, the frighteningly expensive military materiel threatens those who have to buy it more, than those who should fear it.

Therefore, Applicant termed this dangerous technological trend as "Degeneration of progress" (July 1972 CHEMTECH editorial), and illustrated with his U.S. Pat. No. 4,011,919 and 4,165,846 that cars and planes can be built much safer, simpler and more profitably.

Also the purpose of this application is the provision of more "appropriate technology" (June 16, 1980 C&EN) for nature's most convenient source of energy, e.g. as illustrated by the "Lighter than Air Turbine" according to U.S. Pat. No. 4,207,026. In contrast, the million $ or DM "Growian" (Jan. 1981 POPULAR SCIENCE) defies its safe and abundant utilization.

SUMMARY OF THE INVENTION

The present invention concerns and has for its object the provision of a simple, adjustable windmill, or air reaction turbine respectively, ranging from a tethered, lighter than air wind motor, to a pole or tree-anchored turbine. It comprises: A. a tetrahedral support structure; B. at least one blade extending into opposite tetrahedral edges of said structure; C. an axis of rotation extending from said structure's center to a load and D. adjustable means moving said axis towards the center of any of said edges, whereby up to three different pitch positions of said blade can be maintained, depending on the wind velocity.

Moreover, this invention concerns any new part and combination of parts disclosed herein, the processes for their manufacture, as well as their use.

BRIEF DESCRIPTION OF THE DRAWINGS

Numerals 0–10 therein refer to positions (points) at parts, and 11–31 to similar parts throughout the drawings.

DESCRIPTION OF THE PREFERRED EMBODIMENTS

Due to the fact that windmill, propeller or reaction turbine blades are conventionally envisaged as parts of a screw, which latter is (again conventionally) defined as an inclined plane (thin wedge) wrapped around a cylinder or cone, said blades' other two rotational axes remained obscure throughout history.

Figure 1:
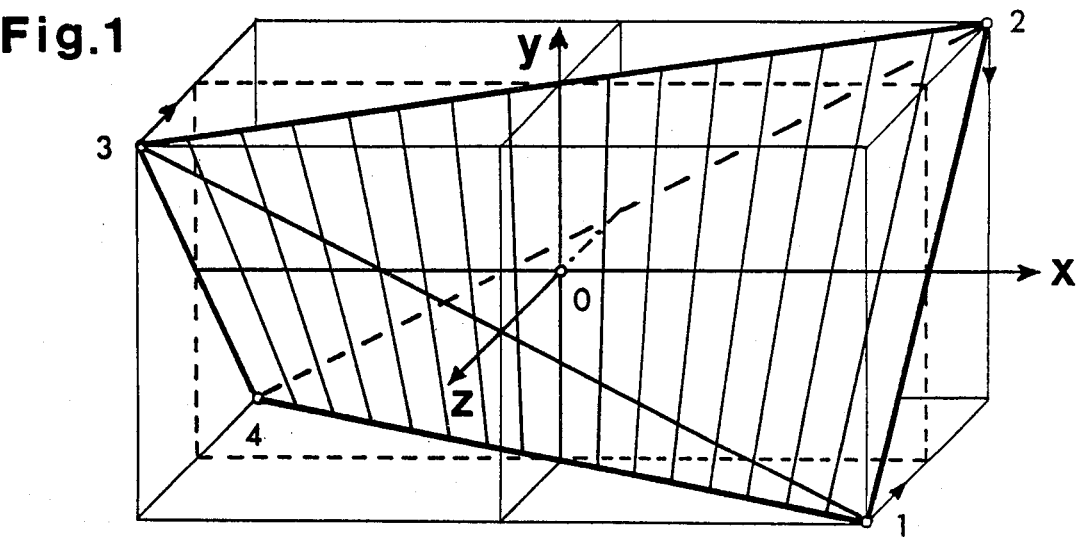
FIG. 1 is a perspective view of said tetrahedral support structure (inscribed into 2 adjacent cubes) of a single turbine blade (1,2,3,4), rotatable around the x, y or z-axes.

If, however, said blades are considered as the wharped main plane of the simplest solid, i.e. the tetrahedron, whose center and opposite edges it contains, then all three spatially different rotational axes of said plane become easily apparent, e.g. as depicted by FIG. 1. Referring to the numerals therein, 1, 2, 3 and 4 define said wharped, tetragonal plane's vertices, 0 its center, (1,2) and (3,4), or (2,3) and (1,4) are said opposite edges, and the tetrahedral support structure is completed by its edges (1,3) and (2,4) outside of said plane. The latter contains the two obscured rotational axes x and y, whereas the third z-axis, perpendicular to it, is considered the conventional (horizontal) windmill, propeller or turbine axle, or shaft respectively.

Figure 4:
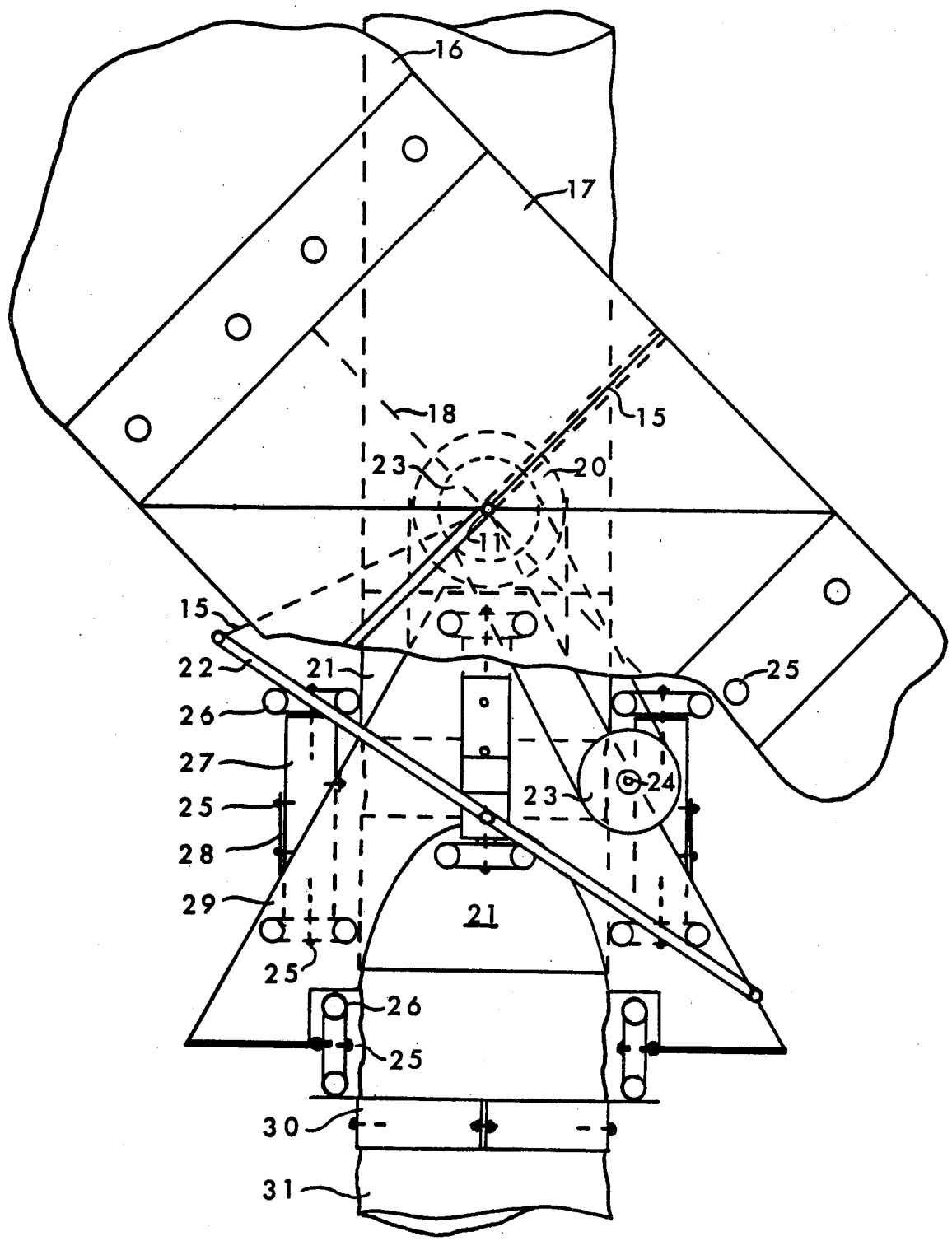
FIG. 4 is a partial front view of a FIG. 2 type air turbine, rotatably anchored at a tree trunk.
Figure 5:
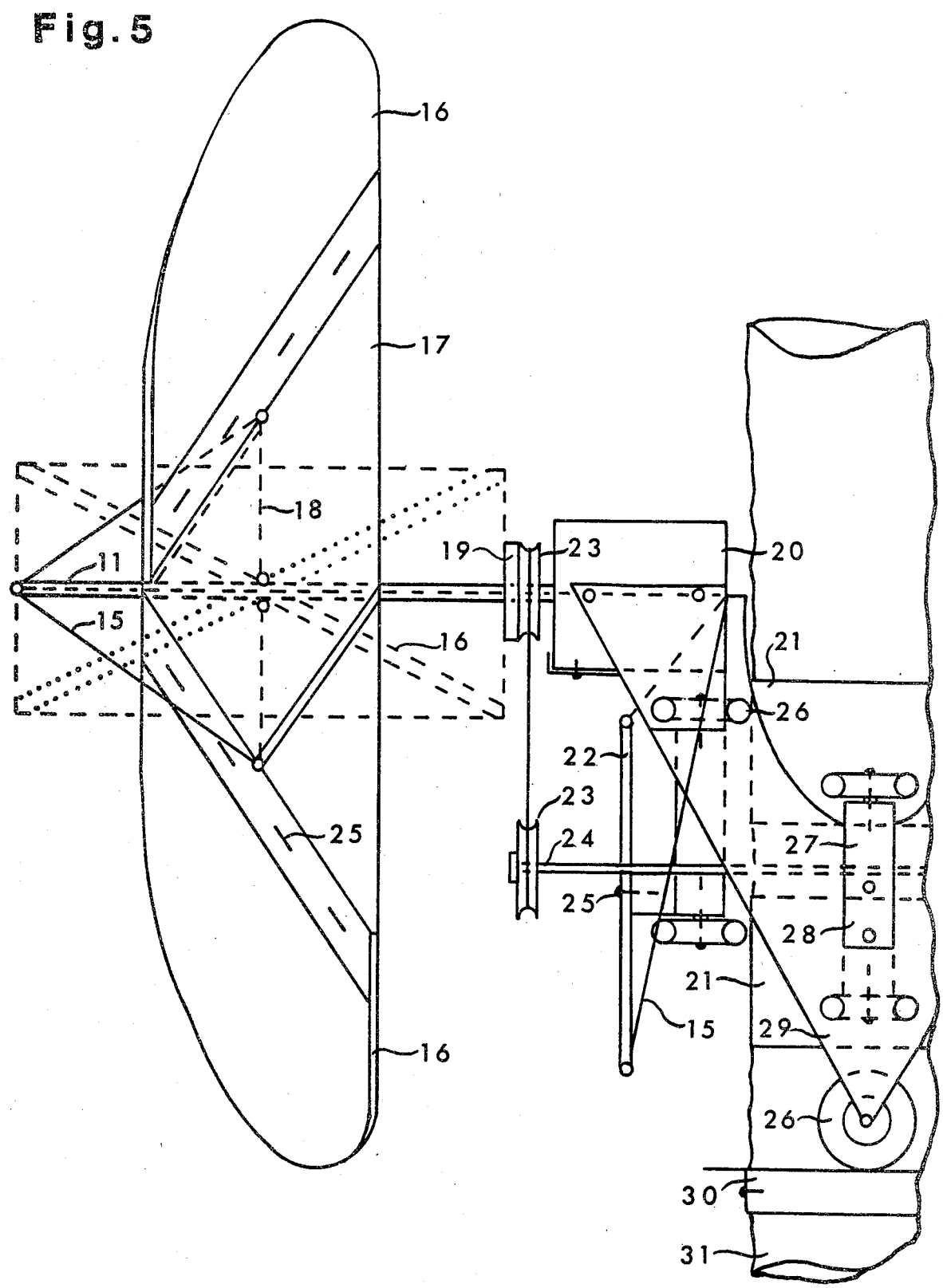
FIG. 5 is a partial side view of the FIG. 4 turbine, rotatable at two different pitch positions (transposed by 45°).

Needless to say, the tetrahedron is considered by the artisan as the solids' most solid member, and should, therefore, be utilized more widely, e.g. according to FIGS. 4 and 5 not only for stabilizing the windmill's blades, but for anchoring it also to a raised position, most cheaply offered by the trunk of a living tree.

Figure 2:
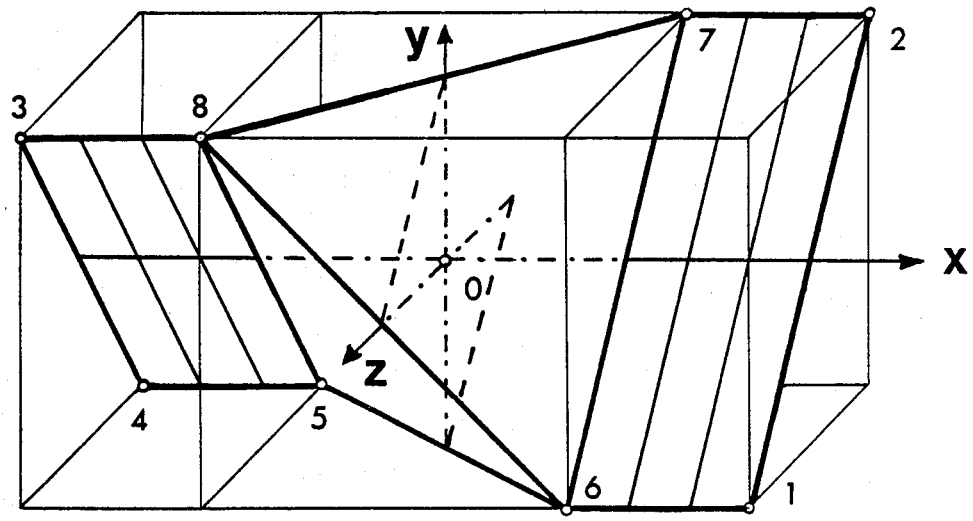
FIG. 2 is a perspective view of a regular tetrahedron supporting two turbine blades (3,4,5,8) and (1,2,7,6), rotatable around the y or z-axes.

FIG. 2 reveals that, for the sake of simplicity, a propeller needs no wharped (curved) surface area, but may be composed of a (flat) tetrahedron, defined by its vertices 5, 6, 7 and 8, and two level blades (3,4,5,8) and (1,2,7,6) attached thereon. Due to the high symmetry of the depicted special propeller, it no longer rotates around the x-axis in wind of x-direction, but only around the y and z-axes. For similar reasons, the blades' pitch and drag are identical for wind from the y or z-directions (45°), but not their rotational direction. If, for example, this propeller's original rotational axis is switched, according to this invention, from the y to the z-direction, by turning the (whole) propeller around its horizontal x-axis, whereby said vertical axis moves, within the slot (broken line) between the centers of the tetrahedron's edges (7,8) and (6,8), into the other horizontal direction z, and the wind blows from the positive to the negative y,z-positions, then said propeller's counterclockwise rotation switches to clockwise, and vice versa.

Figure 3:
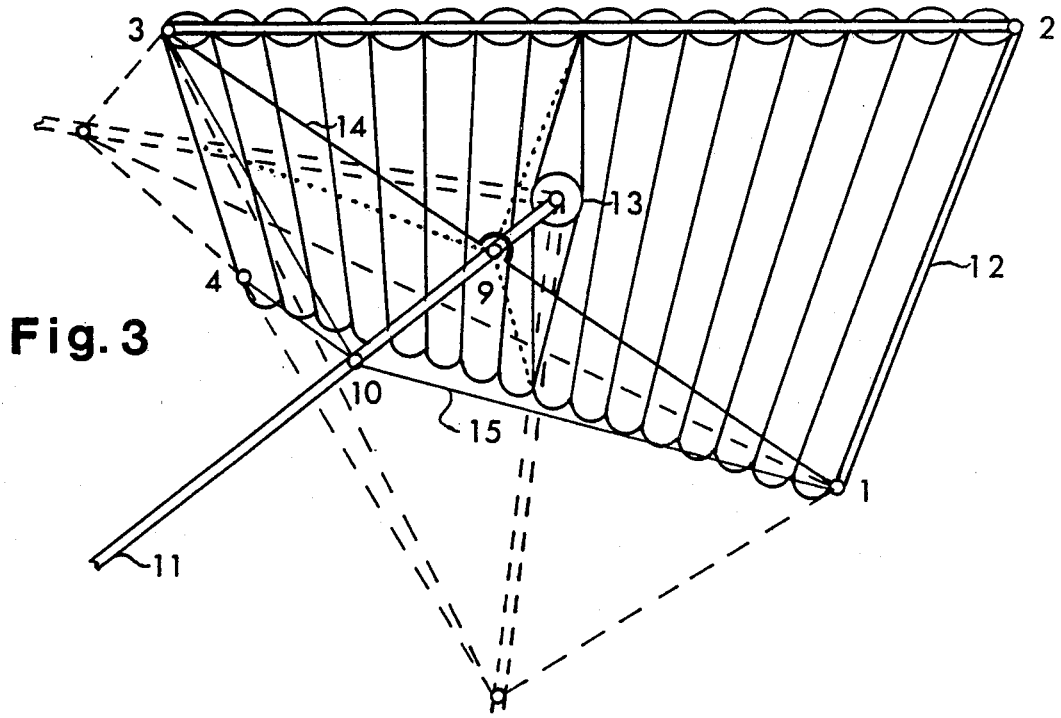
FIG. 3 is a perspective view of a FIG. 1 type tethered, lighter than air wind motor, rotatable at three different pitch positions.

FIG. 3 depicts a tethered, lighter than air wind motor, comprising: (a) a tetrahedral support structure consisting of the tubular, tetragonal frame 12, and of two cables 14 with semicircular tubes in their centers, which cables are connected to said frame's vertices 1,3 and 2,4 (not shown); (b) a hydrogen or natural gas-filled, air mattress-type blade, attached to said frame and containing the compass needle-type pivot 13; (c) a drive hose 11, extending from said pivot through said semicircular portion of the cable 14 to a load, e.g. an electric generator; and (d) three adjustable lines 15, extending from said frame's vertices 1, 3 and 4, through a hole 10 in said hose and the generator's hollow shaft, into a fixed position thereon (hook). In case the wind exerts undue strain (or maximum drag) on said necessarily light structure, the line 15, attached to the blade's vertex 3, is merely released (lengthened) from said first position at the hose's end, while the other lines 15, attached to vertices 1 and 4 (being of different length), are equalized, whereby said blade flips into the second position, depicted by a vertical hose (in broken lines) contacting the center of said blade's leading edge (1,4). At even higher wind velocity, the blade's shorter edge (3,4) is moved into the wind, as depicted by a horizontal hose (in broken lines), by pulling and equalizing the lines 15, attached to vertices 3 and 4, and releasing the third line from vertex 1. Alternatively, said lines 15 are attached to the centers of the blade's edges (2,3), (3,4) and (1,4), as depicted by dotted lines, and fed into the hose 11 through the hole 9 therein. By pulling the line connected with the edge (2,3), and releasing that to the opposite edge, said blade is positioned into the slowest wind, whereas the line attached to edge (3,4) must be pulled in a storm. By this manipulation, the wind motor's speed and direction of rotation, as well as its drag, can be regulated satisfactorily.

FIGS. 4 and 5 depict the main portions of a tree-anchored two-bladed wind turbine with tetrahedral blade and axle support, viewed from the front and side (i.e. after a 90° rotation around the tree trunk), driving one or two electric generators, depending on the wind velocity and blade position. Referring to the numerals therein, 11 defines the hollow rotor axle extending into the hollow shaft of the electric (permanent magnet) generator 20. Said axle carries a FIG. 2 type propeller with a tetrahedral (two part) support structure 17, and level blades 16, fastened by the bolts 25 thereon, and having an opening (slot) in two tetrahedral faces, extending between the centers of two adjacent edges and being parallel to the third, in which opening said axle 11 is located. Said propeller is further held in place by the pivotal or torsional fastening members 18 (rods or cables), attached to opposite anchors in the (approximte) center of said axle 11, and the tetrahedral edges carrying the blades 16. To said edge-centers also the adjusting lines 15, with twist-preventors therein (e.g. ball bearings, not shown thereon), are fed through said axle and generator shaft, and fastened at the ends of the positioning lever 22, which is rotatably attached by the bolt 25 (in its center) to one of the wheel-carriers 27. In the maximum drag position shown for said propeller, it moves but one of said two generators 20 (the other, not shown, is symmetrically positioned at the other, upper vertex of the supporting tetrahedron 29), because the pulley 23, with the (rubber) clutch 19 thereon, merely idles at said axle or shaft 11. It comes into frictional contact with said propeller's tetrahedron 17 (edge) however, when the lever 22 is turned counterclockwise into its symmetric other position, whereby said propeller flips into its minimum drag position (as explained for FIG. 2 above), shown in FIG. 5 by broken and dotted lines. In this position, the other pulley 23 at the shaft 24 is turned via a belt thereon, which analogously turns the second generator 20 (not shown) in the opposite position, having a non-idling pulley 23 at its shaft, because said propeller extracts more wind-energy than in its first position.

In order to have it positioned properly into the wind, the propeller-generator unit is mounted at one vertex of a wheeled second tetrahedron 29 (well-balanced by said second generator), which runs at the wheels 26 on both the circular platform 30, and sheet metal wrappings 21 at the (living) tree trunk 31. From the total of ten wheels 26, two are bearing wheels contacting said (angle iron) platform 30, and the others, arranged in pairs at said (wooden) wheel-carriers 27, contact said trunk wrappings 21. The four carriers penetrate all faces of the tetrahedron 29 near their centers, and are fastened at the cut-out strips 28 thereof, via bolts 25. In this fashion, the eight leading wheels 26 are fastened to the least rigid parts of said tetrahedron 29, thus permitting some suspension for trunk-irregularities, whereas bearing wheels and generators are fastened to the most rigid parts (edges) of the support, in spite of the large opening therein for the trunk. Also the spatial configuration of the tetrahedron is most suitable for this, tree-saving purpose, and it offers a wide support for the long shaft 24 as well.

The electrical energy generated may be extracted in conventional manner. For example, both generators 20, bolted to the cut-out and properly bent sheet metal parts at the upper vertices of the tetrahedron 29, may be grounded thereon, and ultimately, via at least one conducting bearing wheel, to the platform 30. Their hot wires are connected with at least one conducting leading wheel, contacting one of said two wrappings 21, serving individually for the other electrical pole of each generator. In order to prevent electrical damage to the tree, and uneven rotation of the tetrahedron 29 as well, said wrappings 21 should be insulated from the trunk 31, and made cylindrical as well, by properly underlaying them with insulating material, and fastening them to the trunk with non-conducting screws, or tourniquets respectively.

DESCRIPTION OF EQUIVALENT EMBODIMENTS

Having described and schematically depicted the specific, most exemplary embodiments of this invention, the following lists some of the obvious equivalents or derivations thereof. Thus, for example, the wind motor according to FIG. 3, needs not be lighter than air, if it is utilized in a coastal region with a fairly constant breeze, because it is kept aloft like a kite, and stabilized by its gyroscopic forces. Conversely, its buoyancy may be enhanced by either a bulging (rather than flat) mid-section at the pivot 13, or a separate balloon attached to the end of the prolongated hose 11, or a rigid axle respectively. Also the mattress-type blade may be improved by airfoil-shaped halves thereof, whose leading edges point either in opposite directions (when the motor mainly turns in the maximum drag position), or in the same direction (when preferably utilized in the medium drag position). Or it may be replaced by either a single sheet of parachute or sail cloth, or a plurality of narrow strips thereof, as shown in FIG. 1, permitting some penetration of gusts or whorls. The frame 12 consists advantageously of a single plastic tube, which may also be bent into a more oval shape. In case said rigid hose-part 11 does not penetrate the blade, its stabilizing rear-cable 14, attached to the vertices 2 and 4, needs no semicircular tube thereon, nor does the front-cable, if said rigid axle part is braced, e.g. at position 9 (as shown with dotted lines), thus enhancing the blade's rotational stability, but permitting only the two positions, as shown in FIG. 5. Similarly, only the two, dotted adjusting lines, feeding into said part at the position 9, are necessary for the blade-flipping in another derivation. Finally, the torsion-resistant hose 11, advantageously woven from the most advanced polyamides, contains at least two thin tubes for the adjusting lines 15, and stability, which latter is greatly enhanced by pressure-filling said hose with plastic foam (e.g. styrofoam) also. Its connection to a load may be similar to the propeller-generator unit of FIG. 5, and the twist-preventors of the adjusting lines 15, e.g. single teflon balls within spherical capsules, or conventional ballbearings, may be located inside or outside of said hose 11. Since the propeller is gyroscopically stabilized in either position, the adjusting lines can be maintained rather loosely, so that the friction within the twist-preventors is minimal. Due to the great variability of the propeller's pitch (angle of attack), which can be tuned by varying the length of the cables 14, said wind motor automatically rotates in higher altitudes at maximum drag, than in the medium and minimum drag positions, what is a safety advantage, because the wind slows down with decreasing altitude.

Regarding the pole or tree mounted wind turbine according to FIGS. 4 and 5, it may contain the FIG. 1 or 3 type (lighter) propeller also, in which case the fastening members 18 (x-axis in FIG. 1) are preferably plastic tubes also, which extend into the shorter edges of the propeller. They may be fix connected therewith, as well as with the axle 11, whereby the propeller is stabilized in the chosen position by the torsion of said members 18. For such a derivation, but a single adjusting line 15 is necessary, the tension of which, as well as of 18, is increased when the blade is pulled into the other drag position. Therefore, into both the terminal end of the generator shaft, and the line-portion close to it, said twist-preventors have to be mounted, in order to prevent the line's undue wear. Again, a plurality of sailcloth strips will prove beneficial for covering the frame 12, because they not only permit gusts to penetrate, but solid objects as well. Needless to say, the tetrahedral support structure of this clothen blade needs no light cables 14 for improving weight, but may be built of uniform edges, e.g. PVC-tubes, which are inserted, or slid onto welded, triangular vertex tubes or rods. This blade's longer edges may also be braced (as the shorter are by 18), and even the exterior edges 14 thereof, may be braced near their centers by rods between the blade-strips, in order to obtain a light, but very rigid blade support.

This is certainly the case with the sheet metal-plywood combination propeller depicted by FIGS. 4 and 5. Its tetrahedral part 17 is bent from two symmetrical metal strips, as depicted by FIG. 2 also (bent edges 6,7; 6,8 and 5,8), the plywood blades 16, and fastening members 18, positioned inbetween, and the whole fixed by the bolts 25; if desired by additional bolts at the two unconnected (slot) edges (5,6) and (7,8) thereof. As mentioned before, if the torsional elasticity of the fastening member 18 permits a 90° turn of this propeller (around the x-axis), a single adjusting line 15 (the upper in FIG. 5) will suffice, but the lever 22 has to be locked into the tenser position.

The axle or generator-supporting tetrahedron 29 is also composed of similarly bent two parts, which necessarily contain but half of the trunk-openings. However the flanges, formerly carrying the blades, are now bent inwards also, in order to bolt all separate tetrahedron faces to each other properly, utilizing the large generator openings for reaching inside. Needless to say, this turbine may be utilized with a single generator only, whereby the parts 19, 23 and 24 become superfluous, and the different rotational and power output of the blade may be conventionally regulated by gears attached to said generator. For this derivation, the second upper vertex of the tetrahedron 29 lends itself for the mounting of a conventional vane, pointing the propeller into the wind; otherwise it rotates lee of the trunk.

As mentioned before, a permanent magnet generator is most suitable for this utilization also, due to the following advantages: (a) it is cheaper than doubly armored generators, because magnets, such as barium ferrites, are less expensive than copper windings; (b) it prevents undue idling in non-utilizable breezes; and (c) it permits the substitution of said gears also, by changing the magnetic flux therein. Thus, for example, said generator 20 may contain a conventional 4-pole rotor, but only 2 permanent magnet poles fixed therein, generating a lesser amount of current in the less powerful maximum drag position of the propeller thereon. By turning it into the other position via (at least one) adjusting line 15, said line (or a spring thereon) may pull another pair of permanent magnet poles into proximity of the rotor poles, whereby a greater amount of electrical current is generated. Said movable poles may either slide to and from the rotor poles within channels, e.g. like the commutator contacts, or preferably turn around an axis parallel to the generator shaft and attached to a lever, which latter is connected with the lever 22 via a cable or rod.

The propeller's axle or generator support may be, of course, much simpler either, e.g. when a conventional pole is utilized. However, said support is often so expensive that it again defies the windmill's advantages (amortization) for years. Therefore, if no naturally raised position (tree) is available, the wind motor according to FIG. 3 may be utilized, requiring a shorter pole, on which said generator may be affixed vertically via a universal joint, because the propeller rotates at different altitudes and drag positions. In order to improve this propeller's angle of attack for the lesser drag positions, or slower speeds of rotation respectively, the following changes may be made: In case only two drag positions are utilized, the propeller's longer trailing edge should be heavier than its leading edge. Or a conventional (magnetic) oscillator, e.g. located within the generator's shaft, may periodically release the adjusting, dotted line 15, pulling the hose 11 towards the center of the leading edge (1,4), or (3,4) respectively, whenever the latter approaches a position above (or on top of) said hose 11. In other words, the rotational axis of the propellers according to this invention must not be adjusted into the precise centers of the supporting tetrahedron's edges all the time, because said propellers also rotate (less efficiently) at axis positions between the edges' centers.

Needless to say, said turbines according to this invention may not only be utilized for generating energy, but for absorbing it also, i.e. for generating movement of, or thrust within, gases or liquids, e.g. like Kaplan turbines, acting as pump as well.

If not mentioned already, the turbines according to this invention are constructed of any suitable material utilized for purpose-similar parts presently and by methods consistent with conventional engineering techniques, e.g. those disclosed in the patents and articles cited above.

Most preferred are, of course, fully or semi-automatic derivations, whose rotational speed and/or pitch is adjusted by the wind, or its pull or push at the rotational axis respectively. Thus, for example, said single adjusting line derivation of the FIGS. 4 and 5 turbine may be augmented with an electric switch at the arm of lever 22 opposite to that holding the line 15 against the torsional force of the fastening members 18. Moreover, its motor/generator 20 contains a conical rotor, held by a spring at its bearing next to the pulley 23 at the farthest pole-distance therein. With the increasing pull of the axle 11 said spring is compressed and the pole-distance diminished, whereby the load is increased, triggering at a certain voltage/current level said switch, which pulls the blade-carrying tetrahedron 17, via the upper line 15, into the other drag position indicated in FIG. 5. Thereby, the second generator is activated by the clutch 19, but the pull at the first rotorcone (pointing toward 19) is diminished, and said spring increases the pole-distance again. In case both generators' current falls below said switche's trigger level, it releases the lever 22 and the member 18 flips the propeller into the original position.

Another trigger mechanism may be activated by the propeller's deformation in the maximum pitch position according to FIG. 3, which propeller again is said single adjusting line, two pitch derivation with the dotted lines 15 therein, of which that between 9 and the leading edge (1,4) is said adjusting line, that between 9 and the shorter edge (3,4), and another (not shown) between 9 and the edge (1,2), are bracing lines not extending into the hose 11, and the fourth between 9, a small pulley near the center of edge (2,3) (not shown) and attached to the center of the (invisible) lee-edge 14 between vertices 2 and 4, is the trigger line, the other end of which is fastened to a simple electric switch, counterbalanced by a spring. As soon as the wind exerts undue strain on such a blade, the external lee-edge thereof (not shown) slackens, permitting said spring to pull the electric switch and the trigger line into another position, conducting current into a servo-motor, winding the adjusting line (from edge 1,4) onto its shaft and increasing the torsional force of the pivot 13 (connected in said derivation with torsion tubes at the centers of the shorter edges of frame (12) at the rigid part of hose 11, and the tension of said trigger line as well, resetting the switch. In this blade position, both cables 14 are exposed to the wind equally, but their tension increases now with the velocity of the wind, which tends to un-wharp the blade. Therefore, the more stretched trigger line is now released at a slower rotation of the medium drag blade, permitting the spring thereon to pull the switch again for the servo-motor's opposite rotation.

Naturally, the various drag positions of the turbine blades according to this invention, have to be adjusted to the wind, load and/or control system chosen. As mentioned for FIGS. 1 and 2, the drag positions differ from each other the more the tetrahedral support structure deviates from the regular tetrahedron, which latter offers only a single (45°) blade-axis angle or, in general, a median blade perpendicular-axis angle. The smaller it is, or the flatter said tetrahedron respectively, the larger the drag and rotational speed, but the smaller the power output, and vice versa.

Due to the fact that windmills "can be wrecked in a matter of minutes", whenever their control system brakes down (Mar. 9, 1981 DIE WELT, reporting also that recently "eight German designs have proved faulty" in this respect), it is mandatory to connect them with a fairly constant load of high capacity, e.g. a pump with unlimited influx, or an electric generator heating and/or electrolyzing water without interruption. Finally, in case the load-absorbing device fails to convert the wind energy properly, said generator with conical rotor may permit the poles' frictional contact, in order to slow a hazardously fast spinning rotor down like a drum brake. In order to guarantee abundant utilization of said turbines, the cheapest materials and most uniform (standardized) parts should be used, e.g. said (araliphatic) polyamides for 11, 14, 15 and blade (strips), plywood for 16, 17 and 29, or zinced steel sheet for the latter on their edges only, rubber tired steel or plastic wheels etc.

I claim:

1. An adjustable reaction turbine comprising: (a) a tetrahedral support structure whose opposite edges are of equal length; (b) at least one blade extending into opposite edges of said structure; (c) an axis of rotation pivotally and/or torsionally attached to said structure's center and extending to a load and (d) adjustable means for moving said axis toward the center of any of the tetrahedral edges, whereby said turbine's speed and/or direction of rotation is changed.

2. A turbine according to claim 1, wherein said support structure comprises a solid tetragonal frame (12), which is wharped by two diagonally positioned, solid or flexible edges (14).

3. A turbine according to claim 1, wherein said support structure comprises a solid tetrahedron (17), having an opening within at least one of its faces, extending between the centers of two adjacent edges thereof.

4. A turbine according to claim 2, wherein a lighter or heavier than air blade is attached to said frame.

5. A turbine according to claim 3, wherein two blades (16) are attached to said tetrahedron's opposite edges, which are devoid of said opening.

6. A turbine according to claim 4, wherein said blade's axis of rotation (11) is connected with a pivot (13), extending into the centers of the frame's longer edges.

7. A turbine according to claim 5, wherein said blades' axis of rotation (11) is connected with two fastening members (18), extending into the centers of opposite tetrahedral edges, which are devoid of said opening.

8. A turbine according to claims 6 or 7, wherein said axis of rotation (11) extends into a load-providing electric motor/generator (20).

9. A turbine according to claim 6, wherein said blade's axis of rotation (11) contains at least one adjusting line (15), attached to any of the blade-supporting edges and movable in the directions of said axis, whereby the tetrahedral edges' distance from said axis is varied.

10. A turbine according to claim 7, wherein said blades' axis of rotation (11) contains at least one adjusting line (15), attached to that edge containing said opening and movable in the directions of said axis, whereby the distance of said edge from said axis is varied.

11. A turbine according to claims 9 or 10, wherein a chosen blade-axis angle is maintained by a torsional force exerted at the blade-axis connection (13, 18).

12. A turbine according to claim 1, wherein said axis of rotation (11) extends into the edge of another tetrahedral support structure (29), rotatable on at least two wheels (26) at the opposite tetrahedral edge next to said wheels' ground (30).

13. A turbine according to claims 8 or 12, wherein the tetrahedral edge farthest from the ground contains two electric motor/generators, one directly connected with said axis of rotation, the other via a clutch/pulley/belt drive (19, 23, 24) thereon.

14. A turbine according to claims 8 or 13, wherein said motor/generator contains a plurality of permanent magnets, a fraction thereof is positioned therein at variable distances from the electric magnets' poles.

15. A turbine according to claim 8, wherein said motor/generator contains a conical rotor maintained by a spring at the farthest pole-distance, which is diminished by the pull or push of said axis of rotation.

16. A turbine according to claim 8, utilized for the heating and/or electrolyzing of water.

* * * * *